F. HEEREN.
Lactometer.

No. 241,655.    Patented May 17, 1881.

WITNESSES:
Chas. Nidd.
C. Sedgwick

INVENTOR:
F. Heeren
BY Munn & Co.
ATTORNEYS.

UNITED STATES PATENT OFFICE.

FRIEDRICH HEEREN, OF HANOVER, GERMANY.

LACTOMETER.

SPECIFICATION forming part of Letters Patent No. 241,655, dated May 17, 1881.

Application filed March 10, 1881. (No model.)

*To all whom it may concern:*

Be it known that I, FRIEDRICH HEEREN, of Hanover, Germany, have invented a new and Improved Apparatus for Testing Milk, of which the following is a specification.

The object of my invention is to provide a new and improved device for testing milk by comparing the color of the same with a scale of shades of colors.

The invention consists in a scale of shades of colors corresponding to the various shades of colors of milk, both in a pure state and also when diluted or adulterated, in combination with a receptacle for receiving a thin layer of milk, the shade of color of which is compared with the shades of colors on the scale for the purpose of ascertaining the quality of the milk.

Figure 1:
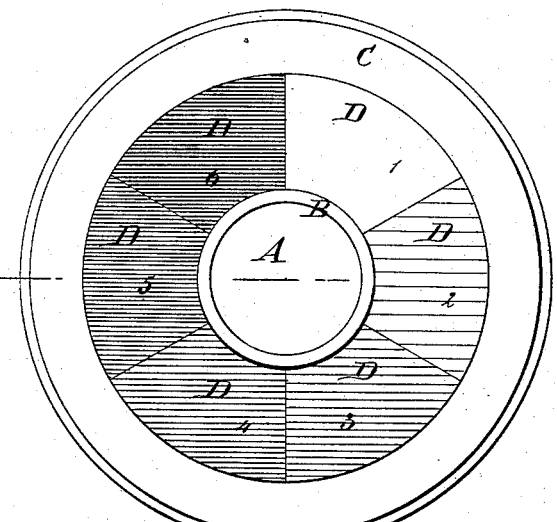
Figure 2:
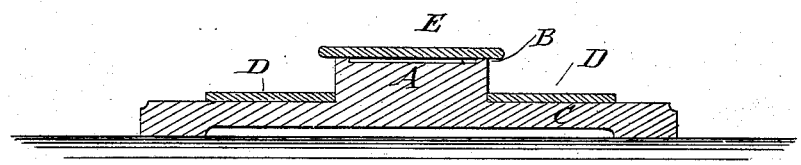
Figure 3:
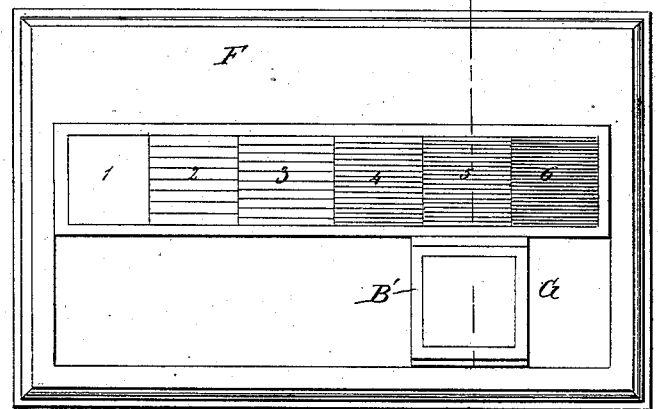
Figure 4:
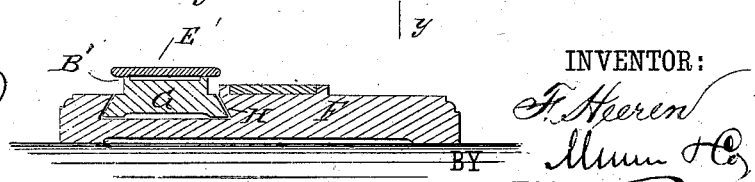

In the accompanying drawings, Figure 1 is a plan view of my improved apparatus for testing milk. Fig. 2 is a cross-sectional elevation of the same on the line $x\,x$, Fig. 1. Fig. 3 is a plan view of a modification of the same. Fig. 4 is a longitudinal sectional elevation of the same on the line $y\,y$, Fig. 3.

Similar letters of reference indicate corresponding parts.

A plate, A, of hard rubber, wood, metal, or other suitable material, with a rim, B, about one-fiftieth of an inch high, is arranged in the center of a plate, C, upon which a series of colored subdivisions, D, are arranged around this central plate, A, these colors being graduated from white to a light cobalt or sky-blue. A glass plate, E, fits upon the central plate, A.

The colored spaces D may be arranged in a row on a plate, F, provided with a groove, H, adjoining and parallel to this row of colored spaces, in which groove a plate or block, G, slides, provided with a rim, B', also about one-fiftieth of an inch high, so that this block G can be placed opposite to each colored space, the colors of which are also graduated, as described. A glass plate, E', fits upon this block G.

The plate A and the block G are preferably raised above the colored spaces to permit of removing the milk that is poured into the recess formed by the rim without soiling the color-scale. Or the milk can be placed into a recess in a circular plate provided with a rim, as described above, upon which plate a circular glass plate rests, having the color-scale painted thereon in a ring, so that the center of the glass plate is unpainted and transparent. The color of the milk can then be compared with the colors of the scale, or the scale and the plate for receiving the milk may be combined in any other suitable manner.

The plate upon which the milk is placed is to have a dark color, so that the color of the milk will show very clearly.

The operation is as follows: It is well known that pure rich milk is white and assumes a more or less bluish hue accordingly as it is more or less adulterated or diluted. A small quantity of the milk to be examined is placed in the recess formed by the rim of the milk-receiving plate, and this milk is then compared with the several colored spaces of the color-scale, and the quality of the milk will be that corresponding to the colored space having the same color as this thin layer of milk. For instance, space No. 1, which is white, will correspond to pure rich and extremely fat milk; the next darker space, No. 2, to fatty milk; No. 3, good normal milk; No. 4, thin milk; and No. 5, very poor and thin milk, &c.

Any desired number of spaces may be arranged in the color-scale, and the degrees may be adjusted as minutely as desired.

Any other color besides blue that may correspond to the various colors of milk may be arranged on the scale.

Having thus fully described my invention, I claim as new and desire to secure by Letters Patent—

1. In an apparatus for testing milk, the combination, with a milk-receptable, of a plate having a series of colors graduated from white to a light cobalt or sky-blue, the milk-receptacle and the plate of colors being so arranged that the eye may at the same time see the color of the milk and the series of colors on the plate, substantially as described.

2. In an apparatus for testing milk, the combination, with the plate F, provided with a color-scale, and with a groove, H, of a milk-reciving block or plate, G, sliding in the groove H, substantially as herein shown and described, and for the purpose set forth.

In testimony whereof I have signed my name to this specification in the presence of two subscribing witnesses.

FRIEDRICH HEEREN.

Witnesses:
WILLIAMS C. FOX,
JOHS. KRACKE.